J. H. GRUBE.
TIRE LINER MOLD.
APPLICATION FILED DEC. 28, 1917. RENEWED JUNE 4, 1919.

1,312,627.

Patented Aug. 12, 1919.

INVENTOR.
John H. Grube
BY
ATTORNEY.

UNITED STATES PATENT OFFICE.

JOHN H. GRUBE, OF LOS ANGELES, CALIFORNIA, ASSIGNOR TO AIRSAFE INNER TIRE COMPANY, OF LOS ANGELES, CALIFORNIA, A CORPORATION OF NEVADA.

TIRE-LINER MOLD.

1,312,627.     Specification of Letters Patent.     Patented Aug. 12, 1919.

Application filed December 28, 1917, Serial No. 209,282. Renewed June 4, 1919. Serial No. 301,811.

*To all whom it may concern:*

Be it known that I, JOHN H. GRUBE, a citizen of the United States, residing at Los Angeles, in the county of Los Angeles and State of California, have invented a new and useful Tire-Liner Mold, of which the following is a specification.

This invention relates to a mold and particularly pertains to a mold for forming tire liners such as set forth in my copending application for United States Letters Patent filed December 28, 1917, bearing Serial Number 290,281.

In the manufacture of the tire liner above referred to, it is necessary to build up a tubular annulus divided circumferentially upon its inner periphery, and to form an integral flap on one of the edges adapted to overlap the inner face of the other edge.

It is the object of this invention to provide a mold whereby the tire liner may be built up and formed with the inner flap in one operation by the use of a single mold and which mold embodies a series of sectional parts adapted to be assembled as building up of the tire liner progresses, and to be taken apart after the tire has been formed and the tire removed therefrom without being distorted.

Other objects will appear hereinafter.

The invention is illustrated in the accompanying drawings, in which.

Figure 1:
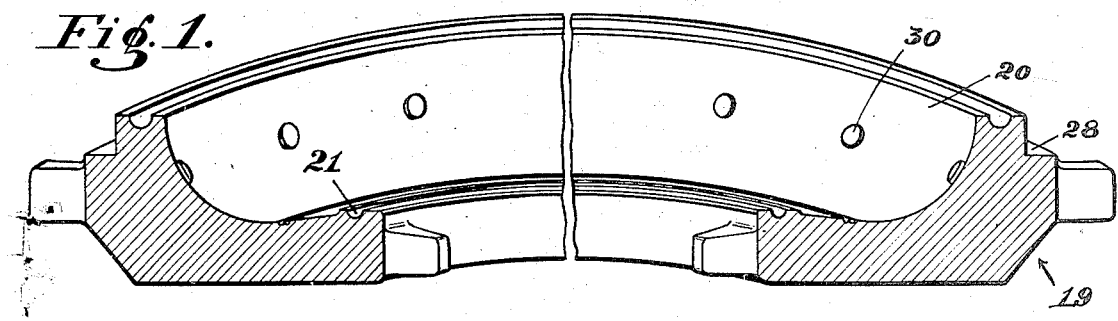
Figure 1 is a view in perspective and section illustrating a half of the lower or drag portion of the mold.
Figure 2:
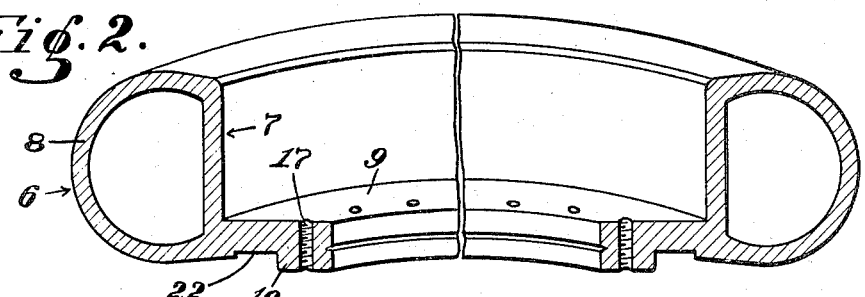
Fig. 2 is a similar view of the core.
Figure 3:
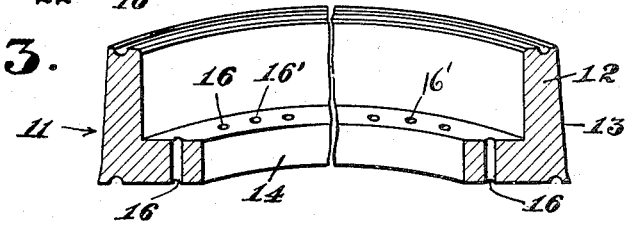
Fig. 3 is a view of the flap forming annulus or supplemental cope.
Figure 4:
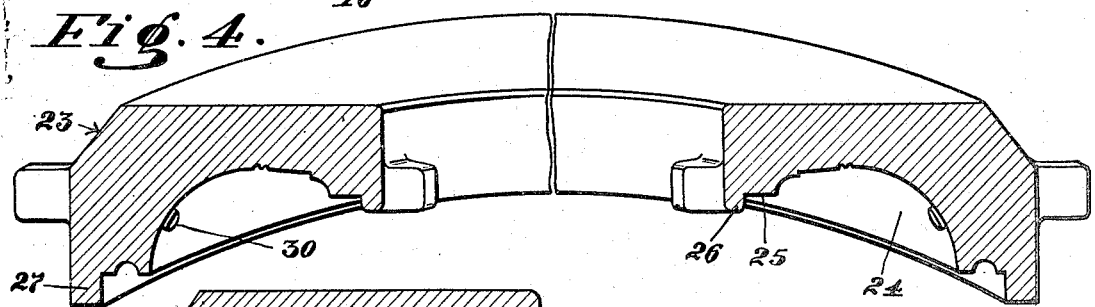
Fig. 4 is a view of the cope.

More specifically 6 indicates the core which is in the form of a tubular annulus having a flat inner wall 7 and an arcuate outer wall 8 having its cross section formed on an arc greater than a semi-circle and with its side-portions joining the inner wall. Extending inwardly from one edge of the wall 7 at right angles thereto is a flange 9 having a down-turned lip 10 on its inner marginal edge. This flange is provided as a seat for the flap forming annulus 11 which comprises a ring 12 having an upwardly beveled outer face 13 and formed with an inwardly projecting flange 14 adapted to seat on the flange 9 and to be secured to the latter by bolts 15 passing through perforations 16 in the flange 14 and screwing into threaded openings 17 in the flange 9. The annulus 11 is of such outside diameter that when seated on the flange 9 its lower edge will contact wall 7 of the core and is of such height that its upper edge will be on a plane substantially corresponding to that of the upper edge of the wall 7. The beveled outer face of the annulus will thus form a tapered channel 18 between the core and annulus.

The drag 19 comprises an annular body having a concave upper face 20 terminating on the inner marginal edge of the drag in a flange 21 adapted to extend into an annular channel 22 formed on the under side of the core around the lip 10; the flange 21 and the channel 22 serving to center the core relative to the drag.

The cope 23 comprises an annular member formed with a concave inner face 24 terminating in a flat shoulder 25 adjacent to the inner edge of the cope and which shoulder has a flange 26 on its inner edge. The channel 25 and shoulder 26 form a chamfer adapted to receive the upper edge of the annulus 11 on which the inner portion of the cope seats. The outer portion of the cope is formed with a down-turned annular flange 27 adapted to seat in a chamfer 28 formed on the drag.

The concave faces 20 and 24 on the drag and cope are formed on an arc slightly eccentric to the arc of the core and on a greater radius so as to form a U-shaped space 29 between the core and the cope and drag, having convergent side-portions with one side portion communicating with the tapered channel 18 and the other side portion converging to a wafer edge adjacent to the flange 21. The inner concave face of the cope and drag are provided with spaced studs 30 which project a short distance into the space 29 to form depressions in the outer face of the tire formed in the mold, with the depressions arranged on opposite sides of its tread center.

Figure 5:
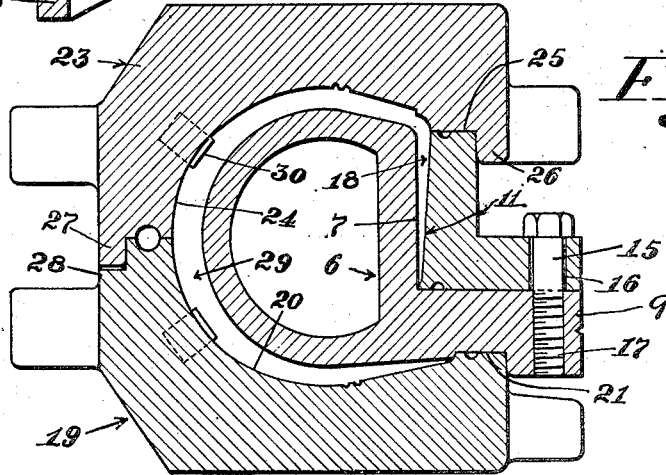
Fig. 5 is a view in section illustrating the assemblage of the parts shown in Figs. 1, 2, 3 and 4 forming the tire liner.

In building up the tire a series of layers of rubber including a strip of fabric reinforcement are laid against the flat face 11 of the flap forming ring with their inner edges offset to form a taper. The ring 11 with its assembly of layers is then set in place within the annular core to press the strips compactly in the tapered channel 18 between the core and ring. A lining sheet of rubber coated with graphite on its inner face is laid over the arcuate portion of the core and the staggered outer edges of the strips clamped in the channel 18 are turned over the upper edge of the wall 7 to overlap said rubber sheet. A series of layers of fabric and rubber are then laid on the lining sheet to build the body of the tire liner and forming the body in continuation of the flap formed in the tapered channel with a cross section substantially corresponding to that of the space 29. The covered core is placed on the drag 19 and the cope 23 is set in position as shown in Fig. 5 thus inclosing the built up body in the mold space 29. The mold is then subjected to such temperature as to vulcanize and unite the rubber sheets and strips into an integral body and thereupon the cope is removed by lifting it vertically from its seated position and the core carrying the formed tire is removed from the drag. The annulus 11 is then elevated after removing the bolts 15 by screwing the bolts through threaded openings 16' in the flange 14 so as to cause them to bear against the flange 9 and thereby force the annulus upward, it being necessary to force the annulus at the start of its removal because of the tendency of the flap forming material to adhere to the walls 7 and 11. The flap will adhere to the tapered face of the annulus and will peel from the core by reason of the latter being previously dusted with talc or the like. On the ring being detached clear of the core the flap is peeled from the heel to the toe of the ring whereupon the tire is freed and may be stripped from the core.

I claim:

1. A mold for forming tire liners comprising an annular drag having a concave upper face, a complementary cope having a concave under face, an annular core having an arcuate cross section and formed with a flat inner wall, and an annulus having a beveled outer face adapted to be set within the core to form a tapered annular channel communicating with a space between the cope and core.

2. In a mold for manufacturing tire liners comprising an annular forming core, having a flat inner wall and an arched outer wall, an annulus formed with a beveled outer face adapted to be encircled by the core to form a V-shaped channel, an annular drag on which the core seats, and a circular cope extending over the core and seated at its inner edge on the annulus and at its outer edge on the drag forming a space between the cope and core communicating with the V-channel.

3. In a mold for forming tire liners, an annular core of arcuate cross section having a flat transverse inner wall, an inwardly projecting flange on one edge of the core, an annulus formed with an inclined outer face adapted to seat on said flange to form a vertical V-channel around the inner periphery of the core, a cope, and a drag adapted to encompass the core having concave inner walls coöperating with the arcuate wall of the core to form a mold space of U-shaped section communicating at one side with the V-channel.

4. In a tire liner mold, an annular core of arcuate cross section with a flat inner wall, an inturned flange thereon formed with a continuous channel on its under side, an annular drag having a concave upper face, a lip on the inner marginal edge of the drag adapted to extend into the channel on the core, a flap forming annulus having a beveled outer face said annulus adapted to seat on the core flange, means for detachably connecting said annulus to the core, and an annular cope having a concave under face, said cope to seat at its outer edge on the drag and at its inner edge on the annulus.

5. A mold for forming tire liners comprising an annular drag having a concave upper face, a complementary cope having a concave under face inwardly projecting studs in the concave faces of the drag and cope arranged at spaced intervals on the opposite sides of the point of intersection of said drag and cope, an annular core having an arcuate cross section and formed with a flat inner wall, and an annulus having a beveled outer face adapted to be set within the core to form a tapered annular channel communicating with a space between the cope and core.

JOHN H. GRUBE.